Sept. 30, 1958 E. A. SCHRAISHUHN 2,854,157
FEEDING GRANULAR SOLID MATERIAL
INTO A HIGH PRESSURE REGION
Original Filed March 23, 1953 2 Sheets-Sheet 2
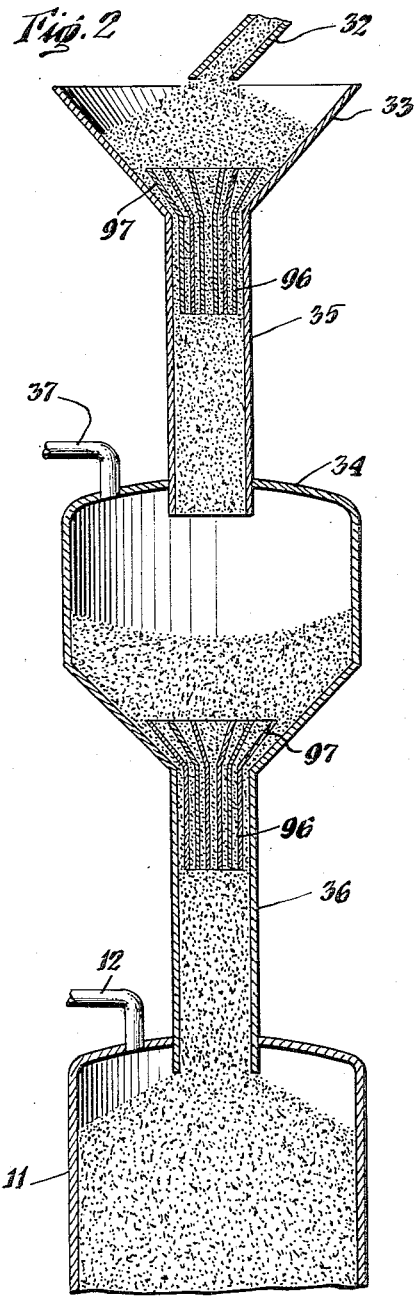
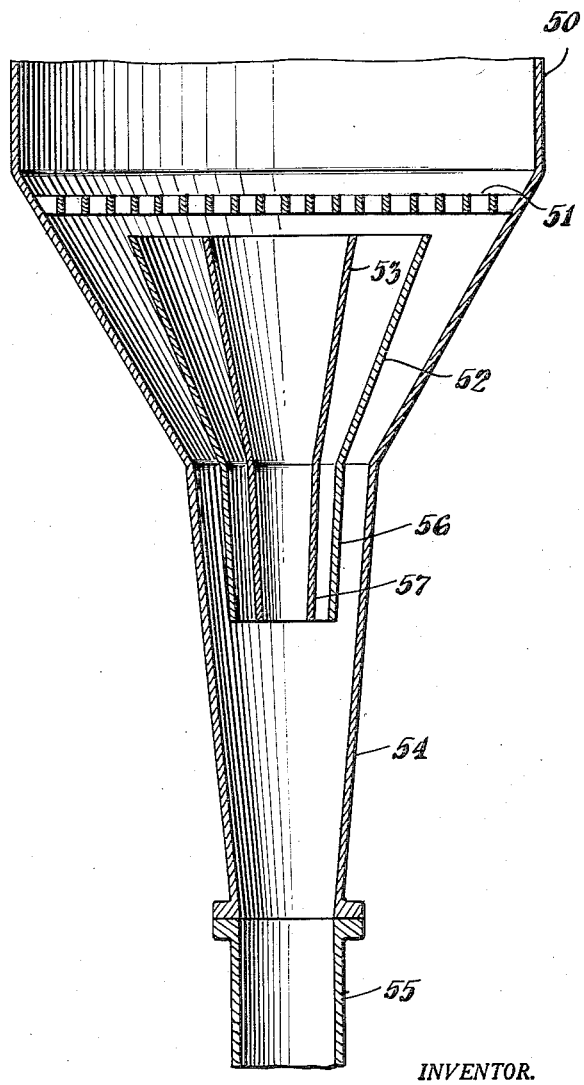
INVENTOR.
Edward A. Schraishuhn
BY Charles A. Huggett
ATTORNEY

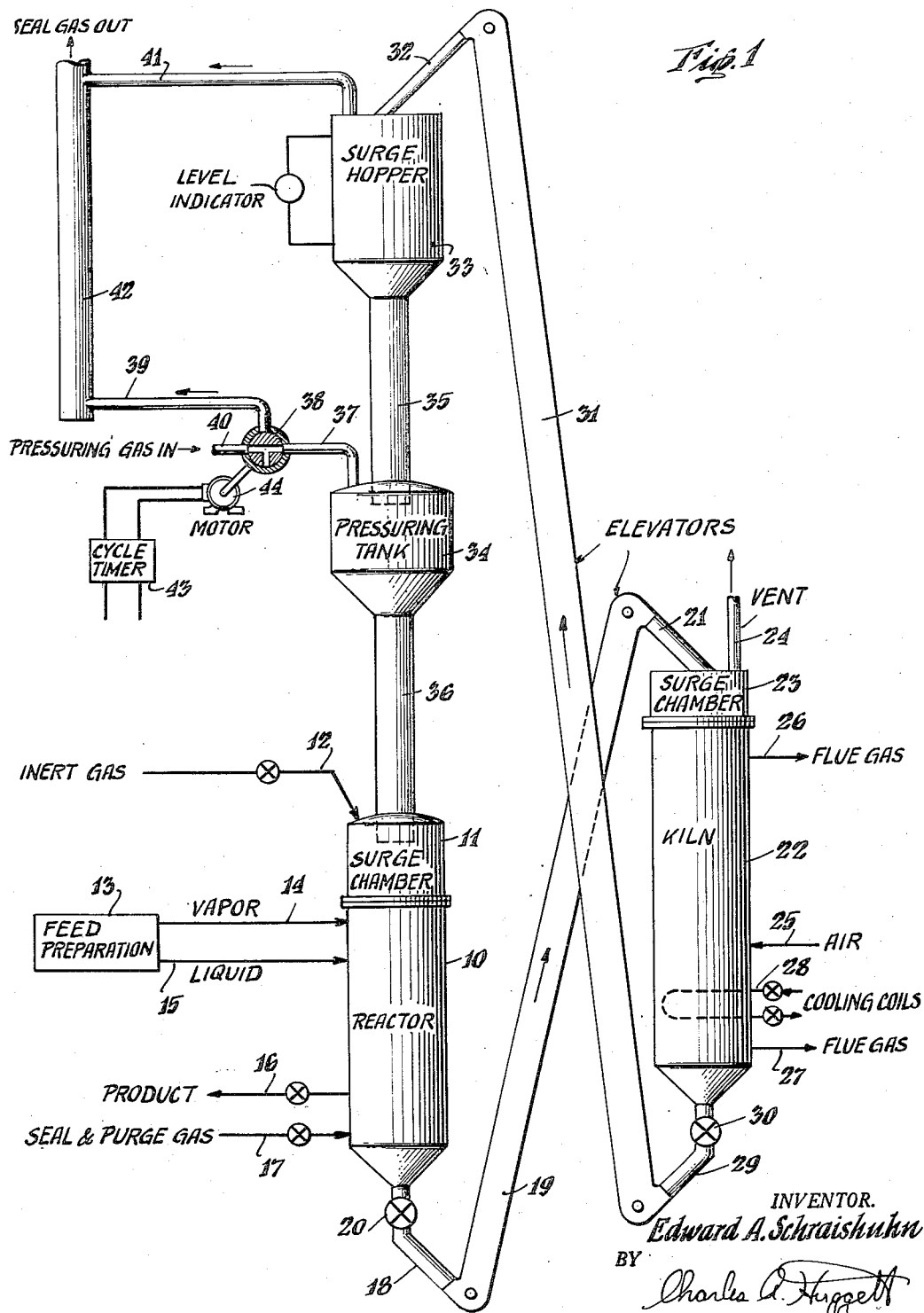

United States Patent Office 2,854,157
Patented Sept. 30, 1958

2,854,157

FEEDING GRANULAR SOLID MATERIAL INTO A HIGH PRESSURE REGION

Edward A. Schraishuhn, Wenonah, N. J., assignor to Socony Mobil Oil Company, Inc., a corporation of New York Continuation of application Serial No. 343,830, March 23, 1953. This application November 26, 1956, Serial No. 624,455

5 Claims. (Cl. 214—17)

This invention pertains to the transfer of solid particles from a zone at low pressure to a second zone at a substantially higher pressure. It more particularly relates to the introduction of granular catalyst or contact material into a gas contacting zone maintained at advanced pressure, such as a reaction zone, from a storage zone maintained at a lower pressure located above the contacting zone.

The invention is particularly suited for use in moving bed conversion systems of the general type in which reaction and regeneration are accomplished simultaneously in separate confined zones through which the catalyst or contact material is passed as a relatively compact bed of solid particles. The fluid reactants, such as hydrocarbons, properly prepared for conversion, are passed through the bed of solid particles in the reaction zone continuously and the regenerating fluid is passed through the bed of solids in the regeneration zone. The particles are transferred continuously from the bottom of one zone to the top of the alternate zone to complete an enclosed cyclic path. The particles may be elevated between the zones by means of mechanical elevators of the bucket or Redler type, fluid lifts wherein the particles are propelled upwardly through a lift passage in a stream of rapidly moving lift gas or gas pressure lifts wherein the granular material is moved upwardly through an upwardly-directed pipe as a continuous confined column by means of the gas pressure differential across the pipe. Various processes to which this invention can be applied include reforming, hydroforming, cracking, isomerization, alkylation, isoforming, aromatization, dehydrogenation, hydrogenation, cyclizing, dehydrocyclizing, treating, polymerization, coking and visbreaking.

Realizing that the invention has broad application to many processes, such as those listed above, as well as to other gas solids contacting operations, it will be described with reference to the catalytic cracking of hydrocarbons to produce lighter material boiling in the gasoline boiling range. The catalyst in this process is gravitated as a substantially compact bed through the reaction zone. The zone is maintained at a temperature of about 800–1000° F., and at an advanced pressure of about 5 to 60 p. s. i. (gauge). The reactant material is usually preheated to about 700–800° F., and introduced into the upper portion of the reaction zone to contact the solids bed. The reactants may be in the liquid, vapor, or mixed liquid and vapor phases. Upon contacting the hot catalyst, the liquid portion is rapidly transformed into a vapor and the gas travels through the void spaces in the catalyst bed. The converted hydrocarbons are continuously withdrawn from the bed. The flow of reactants may be concurrent, counter-current, split flow or even cross-flow with respect to the flow of the catalyst. The catalyst is removed continuously and transferred to the top of a gravitating bed of solid material in the regenerating zone. A gas, usually air, is introduced into the bed of solids in the regeneration zone to burn the carbonaceous material from the surface of the contact material. The flue gas is removed continuously from the zone after passage through the required depth of catalyst bed. The pressure is generally maintained at substantially atmospheric pressure although in some instances, it is desirable to maintain this zone at other pressures. The temperature in the regenerating zone is usually maintained at about 1000–1300° F. When inerts are used, such as Carborundum, coke or fused alumina, the temperature may be substantially in excess of 1300° F., but for catalytic cracking, the upper limit must not be exceeded or the catalyst material will be heat damaged and rendered unfit for re-use. The heat damaging temperature varies to some extent with the type of catalyst material being used, e. g., the limit for natural or treated clay catalyst is about 1200° F., whereas the limit for silica-alumina gel-type catalyst is about 1400° F.

The regenerated or reactivated contact material is withdrawn from the bottom of the regeneration zone and transferred continuously to a hopper located above the reaction zone. The hopper is generally maintained at a pressure about equal to that in the regeneration zone. Therefore, the contact material must be transferred from the hopper downwardly into the reaction zone against a substantially advanced pressure. In the prior art, the hopper has been located a substantial distance above the reactor and the contact material gravitated as a compact column downwardly from the bottom of the hopper through an elongated conduit or gravity feed leg of restricted cross-section. The gravity feed leg is described and claimed in U. S. Patents 2,410,309 and 2,531,365. This feed leg comprises an elongated substantially compact column of catalyst in an upwardly-directed passage above the reaction zone in open communication with the pressured reaction zone. The calculated head or weight of catalyst in the column per unit of cross-sectional area is sufficient to permit the catalyst to feed into the reaction zone smoothly against the advanced pressure without restrictions in the passage. There is no head developed in a catalyst column maintained in compact form in the manner that a fluid head is developed at the base of a pipe full of fluids. However, it has been found that when the value obtained by dividing the weight of catalyst in the column by the cross-section of the base of the column is above a critical limit, the solids will flow downwardly in compact columnar form into the advanced pressure zone and when the value is below the critical level, the solids will not flow. It is convenient, therefore, to refer to the so-called calculated head of catalyst in the feed leg. The column is made as small as possible in cross-section, consistent with the catalyst flow requirements of the reaction zone, to prevent escape of reactants from the reaction zone. The top of the column is continuously replenished with catalyst from the storage zone. The gravity feed legs of the compact flowing catalyst type required the provision of roughly 4–5 feet of leg height per pound of pressure differential across the leg. As a result of obvious practical considerations, such legs have not been recommended in systems requiring the feeding of catalyst against gaseous pressure differential in excess of about 30 pounds and have not been used commercially for feeding against pressures in excess of about 15 p. s. i. (gauge). Even in the present day commercial catalytic cracking units these legs are about 80–100 feet tall and require extensive structural steel to support them and their related hoppers at heights up to twice the heights which would be required if they could be eliminated.

A method has been described in co-pending application, Serial Number 344,576, filed March 25, 1953, for eliminating the gravity feed leg. This method makes it possible to utilize materially greater reaction pressures and yet use structures which are substantially smaller in height than former conversion systems. In simple form, this method comprises gravitating solid granular material from a low pressure supply zone or hopper downwardly through a short passage of restricted cross-section into a pressuring zone of enlarged cross-section, while the pressure in the pressuring zone is substantially that of the low pressure supply zone. At intervals the pressure in the pressuring zone is increased until it is substantially the same or slightly greater than the pressure in the reaction zone, located just below the pressuring zone. The granular material then is gravitated through a short passage of restricted cross-section from the pressuring zone into the high pressure reaction zone. While the pressuring zone is under pressure, the short passage above this zone remains full of granular material in static compact form, serving as a seal for the pressuring zone. This is accomplished by expanding the cross-section of the column of granular material at the upper end of the short passage or within the supply zone so that the upward gas velocity at some level in the column at the upper end of the passage or within the supply zone is below the linear gas velocity required to boil the granular material, e. g., to disrupt its compacted state. The short passage has a pressure drop thereacross which is greater than the calculated head of catalyst in the leg. Disruption of the column of catalyst is prevented because there is provided and maintained at all times a bed of catalyst above the level where the upward gas velocity falls below the boiling velocity which is sufficient to overcome the upward forces at that level and maintain the catalyst in the leg in compact form. In order to insure the short passage running full of granular material, a restriction may be provided at or adjacent to the lower end thereof so that when flow occurs throughout this passage, it is not of the "free-fall" type, but rather as a compact gravitating stream of granular solid material. After the level of solids in the pressuring zone has dropped to a pre-determined level, the pressure is released therein and the pressuring zone again fills with solid material from the low pressure supply zone or hopper. Meantime, the short passage connected between the pressuring zone and the top of the reactor serves as a seal in a manner similar to that described for the short passage between the low pressure zone and the pressuring zone.

This invention involves the use of concentrically arranged funnels in the hoppers supplying the seal legs with down spouts at the lower end thereof projected downwardly into the seal legs. The funnels are so arranged that the catalyst feeds downwardly in the expanded bed atop the seal column at a uniform rate at all locations across the bed, and gas passing upwardly through the seal leg is distributed uniformly across the bed. The use of concentric funnels with concentric down spouts in these systems permits substantially greater pressure differentials to be taken across the seal legs because of the above reasons as well as because of the fact that the hydraulic radius of the seal leg and bed thereabove is substantially reduced.

The object of the invention is to provide an improved method and apparatus for feeding palpable particulate solid material from a zone at one gaseous pressure to a second zone at another and higher gaseous pressure.

A further object of this invention is to provide an improved method and apparatus for feeding a granular solid material from a low pressure region to a high pressure region located therebelow through a passage in continuous open communication with both regions.

A further object of this invention is to provide an improved method and apparatus for transferring solids from a supply zone maintained under one gaseous pressure into a gas contacting zone located therebelow maintained under an advanced gaseous pressure through a connecting passage in open communication with both zones.

A further object of this invention is to provide an improved method and apparatus for feeding a granular contact material into the top of a high pressure reactor of a moving bed hydrocarbon conversion system.

These and other objects of the invention will be made more apparent in the detailed description of the invention which follows.

The invention will be described in detail with reference to the following figures:

Figure 1 shows diagrammatically a complete hydrocarbon conversion system;

Figure 2 shows in vertical cross-section the improved feeding arrangement including a supply hopper, a pressuring hopper and the top portion of a contacting reactor with connecting short conduits;

Figure 3 shows a vertical section of the bottom of a supply hopper and short connecting conduit with the baffling arrangement of the instant invention installed therein.

Referring to Figure 1, the invention is applied to a typical moving bed system, such as a catalytic hydrocarbon conversion system for cracking heavy hydrocarbons to produce light material boiling in the gasoline boiling range. The palpable particulate material is gravitated through the vessel or reactor 10 as a continuous column in which the particles remain in contiguous contact throughout their travel through the vessel. A surge chamber 11 may be provided in the upper portion of the vessel by means of a horizontal partition and depending pipe baffle arrangement, common in the hydrocarbon conversion art. An inert gas may be introduced into the surge chamber 11 through the conduit 12 at a pressure slightly higher than the pressure in the reaction zone. Hydrocarbons may be prepared for cracking in suitable feed preparation apparatus, illustrated by block 13, and transferred by the pipes 14, 15 as vapor and liquid material to the column of solid material in the reactor 10. The hydrocarbons travel downwardly through the voids in the catalyst bed and the converted products are withdrawn from the lower portion of the reactor through the conduit 16 to further processing apparatus, not shown. The catalyst bed may be maintained at a temperature of about 800–1000° F., and under a gaseous pressure of about 15–100 p. s. i. (gauge). If reforming operations rather than cracking reactions are to be performed in the reactor, this pressure may be substantially in excess of 100 p. s. i., for example, 200–400 p. s. i. A seal and purge gas, such as steam or flue gas, may be introduced through the conduit 17 into the lower portion of the reactor 10 to strip the solids of vaporizable hydrocarbons and remove them through the conduit 16. The stripped solid material is withdrawn from the bottom of the reactor through the conduit 18 and flows by gravity to the bottom of the elevator 19. The valve 20 may be used to control the downward flow rate of the granular material in the reactor and maintain the granular particles in compacted form throughout the reaction zone. The particles are discharged from the top of the elevator 19 into a descending conduit 21.

The particles flow by gravity through the conduit 21 into the top of the vessel or kiln 22. The upper portion of the kiln or burner 22 may have a surge chamber 23 formed by a horizontal partition and suitable depending pipes for transferring the solids from the surge region downwardly into the burning section of the kiln. The kiln 22 may be vented to the atmosphere by means of the vent pipe 24 located atop the vessel in communication with the surge chamber 23. Air is usually introduced into the lower portion of the kiln through conduit 25 to travel upwardly and downwardly through the voids in the continuous gravitating column of solids and burn carbonaceous material from the contacting surface of the catalyst. The carbonaceous material, usually termed "coke," is formed during conversion on the exterior surface of the solids and within the pores of the adsorptive solid material. The burning effects at least partial removal of the coke with the resultant formation of a flue gas. The burning is usually effected under substantially atmospheric pressure and at temperatures of about 1000–1300° F. The flue gas is removed from the vessel 22 through the conduits 26, 27 in the upper and lower portions of the burning section of the kiln. Cooling conduits, such as 28, may be provided to control the temperature of the burning and prevent heat damage to the catalyst. The regenerated solid particles are withdrawn from the bottom of the burner 22 through the conduit 29. The flow rate of the solids through the burning zone is controlled by the valve 30 to maintain the particles in the form of a continuous column. The particles are lifted through the bucket elevator 31 and transferred by gravity through the short conduit 32 onto the top of pile of solids in the storage or surge hopper 33.

The surge hopper 33 is located a short distance above the reactor 10. A pressuring tank 34 is located between the hopper 33 and the reactor 10. A first short vertical conduit 35 is connected between the surge hopper and the pressuring tank 34 and a second short vertical conduit 36 is connected between the pressuring tank and the top of the reactor 10. A gas conduit 37 is attached to the top of the pressuring tank 34. The three-way valve 38 is adjusted to connect the conduit 37 with the conduit 39, permitting the pressure in the tank 34 to fall to atmospheric. Granular material gravitates through the conduit 35 to fill the tank 34. The three-way valve 38 is then adjusted to connect the conduit 37 with the conduit 40, permitting gas under pressure to be admitted to the tank 34 to raise the pressure in the tank to a pressure near that in the reactor. This permits the catalyst to feed downwardly from the pressuring tank by gravity into the reactor while preventing the flow of solids through the conduit 35. Although the pressure in the tank 34 may be high enough to blow solids upwardly through the conduit 35, this is prevented by this invention by a method and apparatus disclosed in more detail hereinafter. The three-way valve 38 is continually changed from one position to the other periodically to prevent the pressuring tank from emptying of solid material and to permit a fresh supply of solids to transfer from the storage hopper 33 to tank 34. When the pressure in the tank 34 is high, gas escapes upwardly through the passage 35 and discharges from the top of the hopper 33 through the conduit 41. When the pressure in the tank is reduced, the gas escapes through the conduits 37 and 39. Both conduits 39 and 41 are connected into a stack 42, which may be vented to the atmosphere. The opening and closing of the three-way valve is preferably controlled by a cycle timer 43 which operates a motor 44 connected to the valve 38.

Referring to Figure 2, it will be noted that the storage hopper 33 and pressuring hopper 34 each have a gradually tapered bottom so that the catalyst column beginning at the base of each short connecting conduit 35, 36 is expanded at its upper end until an area is reached where the amount of gas which will normally escape upwardly through the connecting leg would not be sufficient to cause boiling of the contact material in the expanded bed. It is important to note that in any system wherein there is provided a seal leg of compacted granular material in open communication with the two zones at different pressure, a certain amount of gas will be forced by the pressure differential to pass upwardly through the interstices between the solid particles so as to escape from the upper end of the seal leg. This escape of gas can only be prevented by the provision of a very high and narrow feed leg through which the solid material is flowing downwardly at a relatively high velocity. In those cases, the amount of gas carried down in the voids of the moving stream of particles may exceed the amount of gas passing upwardly through the lower section of the seal leg, as described in more detail in U. S. Patent No. 2,531,365.

However, in systems of the type herein involved, where it is desired to save height by employing relatively short seal legs as compared to what was known to the prior art, the conditions are such that a certain amount of gas will pass upwardly through the short legs to the hopper thereabove. The resistance to this gas flow is almost exclusively the resistance offered through the narrow portion of the seal leg, such as the column in the conduit 36 when the pressure in the vessel 34 is low or the column 35 when the pressure in the vessel 34 is high. That is, the portion of the column up to the conical base of the hopper thereabove. While the catalyst bed above this column does offer a slight resistance to gas flow, such resistance is negligible compared to that offered under the relatively narrow seal legs in the conduits 35 or 36.

When a substantial pressure drop is taken across the short seal legs, the upward gas velocity in the legs will be higher than that required to boil the catalyst and disrupt the bed. The upward gas velocity is reduced in the expanded portion of the column located in the bottom of the storage and pressuring hoppers. That is the purpose for providing the expanded bed on top of each column. At some level in the bed the upward velocity is reduced to the boiling velocity and with further expansion of the cross-section of the bed above that level, the gas velocity is reduced below the boiling velocity. By maintaining a bed of sufficient cross-section and depth above the critical level, that level at which the velocity of the gas is just equal to the boiling velocity, the entire bed and column can be maintained in fixed position without any substantial movement of the solids. This limits the amount of gas which can escape upwardly from the high pressure zone through the short seal leg to the low pressure zone to a reasonable amount and permits maintenance of the pressure in the high pressure zone. When a higher pressure is maintained across the seal leg, the critical level is moved up in the expanded bed to a higher level and therefore, a deeper bed must be maintained in the storage hopper. This bed must have two characteristics:

(1) A height which is sufficient to overcome the upward force at the critical level, and (2) A cross-sectional area greater than the area at the critical level. Usually the ratio of $$\frac{\text{Diameter of feed tank}}{\text{Diameter of seal pipe}} = \text{broadly within the range about 3-10}$$

where the average pressure differential across the seal leg is within the range about 1–15 p. s. i. per foot. For operations where the average pressure drop is of the order of 1.75 p. s. i. per foot of seal leg height, the above ratio should preferably be from about 4–6. Where the average pressure drop per foot is higher, for example, of the order of 2.5 p. s. i. and broadly in the range of about 2.5–5 p. s. i. per foot of seal leg height, the ratio of diameters should be not less than about 6. The minimum required bed height above the critical level depends, of course, on the relative cross-section of the bed above and below the critical level and on the catalyst density. Also, the minimum bed required increases substantially in direct proportion to the total pressure drop across the seal leg and bed thereabove. Also, it is influenced by the hydraulic radius of the seal leg and of the feed hopper at bed levels both above and below the critical level in the bed, other things such as ratio of hopper to seal leg diameter being constant. In general, a decrease in hydraulic radius in the seal leg or in the feed hopper by use of vertical partitions or baffles greatly reduces the minimum bed height required above the critical. But in any event, the minimum bed above the critical is usually above 2 inches and more often above 6 inches. The hydraulic radius is the cross-sectional area divided by the wetted perimeter.

In this invention, the hydraulic radius is reduced by the insertion in the lower portion of the supply hopper and pressuring hopper of a plurality of concentric frusto-conical baffles 96 and 97 with drain spouts extending downwardly from the bottoms of the conical baffles into the seal legs 35 and 36. The lower end of the conical portion of the baffles is preferably terminated at the upper end of the seal legs and the baffles have a variable slope. That is to say, the outer baffle makes the smallest angle with the horizontal and the baffles make progressively larger angles with the horizontal from the outer to the innermost baffle. The innermost baffle makes the largest angle with the horizontal. The baffles divide the cross-section of the hoppers into annular passages. The slope of the baffles is so selected that the ratio of the area of one of the passages at its upper end is to any other passage at its upper end as the ratio of area of the lower end of the first passage is to that of the second. This arrangement of baffles provides for uniform withdrawal of solids from all portions of the cross-section of the expanded bed into the seal legs 35 and 36. Unless baffles of this type are used, there is a tendency to draw solids mostly from the region directly above the seal legs and less from the sides of the hopper. This causes the surface of the bed of solids in the hoppers to be concave. The gas passing upwardly through the seal columns tends to travel straight up through the shallowest portion of the expanded bed. Therefore, a larger bed must be maintained in the hoppers than would be required if the bed dropped with a flat surface or a convex surface. By using a plurality of concentric baffles with correctly adjusted slopes, and with suitable drain spouts, the solids are made to travel downwardly at a uniform flow rate across the entire expanded bed. The bed surface in the hoppers remains substantially unchanged and, therefore, a shallower bed of solids can be maintained in the hoppers. The drain spouts are made long enough so that the gas passing upwardly through the seal column is distributed uniformly across the expanded bed in the hoppers. Without the use of baffles of the type herein disclosed, there is a tendency for the gas to channel through the bed at the shallowest portion thereof. This causes the gas velocity to be higher in the bed than it is when uniformly distributed across the bed. The concentric baffles and drain spouts effect a substantial reduction of the hydraulic radius permitting higher pressure drops to be taken across the seal legs, all other things being equal.

The maximum hydraulic radius of the passages formed between the concentric funnel spouts in the upper section of the seal leg should be less than four inches and preferably less than two inches. The minimum lateral dimensions in these passages should be at least eight times the diameter of the largest particle or about 1 inch, and preferably at least two inches. The length of the subdivided passages in the seal leg should be at least one and one-quarter to three times the overall seal leg diameter in order to properly serve the function of holding back the catalyst. Furthermore, the length of the down spouts of the funnels should be such that the pressure drop due to gas flow through the passages starting at the lower end of the down spouts and ending at the base of the supply hopper should be substantially greater than the pressure drop due to gas flow through the passages between the inverted conical portions of the funnel-shaped baffles in the supply hopper. The reason for this is that the passage lengths of the several passages formed between the concentric conical portions of the funnel baffles differ and give rise to differing resistances to gas flow therethrough. This would give rise to non-uniform distribution of gas into the catalyst bed unless this effect were counteracted by proper control of the length of the funnel down spouts in the manner above discussed. In any case, the down spouts should be at least one foot long.

The hydraulic radius of the passages in the bed between the conical portions of the funnel baffles should be broadly less than about 8 inches and preferably less than 4 inches. The minimum lateral dimension of these passages is the same as those given for the drain spouts, broadly about 1 inch and preferably at least 2 inches.

In operation, the pressure in the pressuring hopper 34 is reduced to that of the supply hopper 33 by withdrawing gas through the pipe 37. Particles then feed downwardly through the conduit 35 into the hopper 34 to raise the level of solids in the hopper 34. Periodically the pressure in the hopper 34 is increased substantially to that in the vessel 11 by introducing gas into the vessel 34 through the conduit 37. The seal leg 35 remains as a compact column of solids in static condition while the solids feed downwardly through the leg 36 into the high pressure vessel 11. Before the level of solids in the pressuring vessel 34 falls below a predetermined level, the pressure in the hopper 34 is released once again and the seal leg 36 remains as a compact column of solids in static condition while the solids feed downwardly through the leg 35 into the pressuring hopper 34.

Referring now to Figure 3, there is shown an improved form of apparatus. A grating is shown across the lower portion of a feed hopper 50 to reduce the hydraulic radius of the hopper at the level of the grating. This must be located below the lowest level to which the bed of solids in the hopper is allowed to fall. It may be in the form of partitions located across the vessel to provide rectangular passageways for the flow therethrough of solids and gases. The lateral dimensions of the passageway may be as small as those of the down spouts and even as small as five times the largest particle diameter, or about ¾ inch, if the passageways have a rectangular cross-section. The inverted funnels 52, 53 are similar to those described previously. However, a short conduit 54 is provided at the bottom of the hopper 50 and above the seal leg 55, having a slight outward taper. The drain spouts 56, 57 which project downwardly into this tapered pipe, also have a slight outward taper, from bottom to top thereof. The inner drain spout 57 is more nearly vertical than the outer drain spout 56 and both drain spouts are more nearly vertical than the tapered pipe. This provides a pipe of slightly greater cross-section in the region of the drain spouts than at the top of the seal leg 55, so that the drain spouts do not interfere with the downward flow of the solids into the seal leg when the solids are in downward motion. This permits the same flow to be maintained through a seal leg of given size with baffles as without the baffles. Otherwise, a seal leg of slightly larger diameter must be used when using baffles to provide the same flow of solid material to the high pressure vessel as compared to the seal leg diameter required for a given flow without baffles.

It should be understood that this invention covers all modifications and changes of the examples herein chosen to illustrate the invention for purposes of disclosure, which do not constitute departures from the spirit and scope of the invention. This application is a continuation of application, Serial Number 343,830, filed March 23, 1953, now abandoned.

What is claimed is:

1. In a process for intermittently transferring granular solid material from one location to another, the steps comprising: supplying granular solid material to a first region to maintain a compact bed of solids in the lower portion thereof, gravitating the solid material downwardly from the bed through a confined passage into a confined zone therebelow, partitioning the flow of solid material in the bed and passage so as to substantially reduce the hydraulic radius in the bed and column so as to effect substantially uniform downward movement of the solid material at all locations across the bed and so as to effect uniform distribution of gas rising upwardly through the passage across the bed, periodically removing solid material from said confined zone and simultaneously preventing the flow of solid material in said confined passage by increasing the gaseous pressure in said confined zone to a pressure which is above that in said first region by an amount in excess of the value obtained by dividing the weight of the solid material in said passage by the average horizontal cross-sectional area thereof, and preventing disruption of the compactness of the column and upward discharge of the solid material from said passage by maintaining the bed on top of said column of sufficient cross-section and depth, so that the gas passing upwardly therethrough is decelerated to a gas velocity below that which would disrupt the compactness of said bed substantially before it reaches the surface of said bed.

2. In a process for intermittently transferring granular solid material from one location to another, the steps comprising: supplying granular solid material to a first region to maintain a compact bed of solids in the lower portion thereof, gravitating the solid material downwardly from the bed through a confined passage into a confined zone therebelow, dividing the flow of solids in the bed into a plurality of funnel-shaped paths of annular cross-section, the paths being extended substantially vertically downward into the upper end of the confined passage, the annular area of the upper end of one path being related to that of the second path as the annular area of the lower end of the first path is to that of the second, the vertical portion of that path being at least long enough to promote a substantially greater pressure drop across this portion of the path than is encountered across the sloping portion of the path, periodically removing solid material from said confined zone and simultaneously preventing the flow of solid material in said confined passage by increasing the gaseous pressure in said confined zone to a pressure which is above that in said first region by an amount in excess of the value obtained by dividing the weight of the solid material in said passage by the average horizontal cross-sectional area thereof, and preventing disruption of the compactness of the column and upward discharge of the solid material from said passage by maintaining the bed on top of said column of sufficient cross-section and depth, so that the gas passing upwardly therethrough is decelerated to a gas velocity below that which would disrupt the compactness of said bed substantially before it reaches the surface of said bed.

3. The method for intermittently supplying granular solid material from a first zone to a second zone of substantially higher pressure located below said first zone a vertical distance substantially less than that corresponding to a column of said solids of sufficient length to permit the gravity flow of the solids into said lower zone which method comprises: supplying granular solid material to said first zone to maintain a compact bed of solids in the lower portion of the zone, transferring the solid material downwardly from the first zone through a laterally confined path of restricted cross-section, and discharging it downwardly into a confined pressuring zone located elevationally between said first and second zones and existing under a pressure substantially below that in said second zone and sufficiently low to permit gravity flow of the solids thereinto from said first zone, so as to maintain a compact bed of solids in the lower portion of said pressuring zone, splitting the flow of solids in the lower portion of said first zone by flowing same through a plurality of substantially concentric funnel-shaped paths so that the solids bed is divided into a plurality of laterally separated flow passages, the passages being extended downwardly into the confined flow path between the first zone and the pressuring zone, the annular area of the upper end of one passage being related to that of any other passage as the lower end of the first passage is to that of the other passage, the lateral width of the passages in the confined path being at least 2 inches and the hydraulic radius not greater than 2 inches, the length of the passages in the confined path being at least long enough to provide a substantially greater pressure drop across this portion of the passages than across that portion of the passages in the bed thereabove, periodically increasing the gaseous pressure in said pressuring zone to a level near that in said second zone and sufficiently high to permit flow of solids from said pressuring zone downwardly through a second confined path as a compact stream into said second zone, while, without obstructing said first path, maintaining the same filled substantially throughout its length with a compact column of said solids and withdrawing gas escaping upwardly from said column through the compact bed of said solids maintained in the first zone on top of said column, said bed being of substantially greater horizontal cross-sectional area than said column, splitting the flow of solids in the lower portion of said pressuring zone by flowing same through a plurality of substantially concentric funnel-shaped paths so that the solids bed is divided into a plurality of laterally separated flow passages, the passages being extended downwardly into the confined flow path between the pressuring zone and the second zone, the annular area of the upper end of one passage being related to that of any other passage as the lower end of the first passage is that of the other passage, the lateral width of the passages in the confined path being at least 2 inches and the hydraulic radius not greater than 2 inches, the length of the passages in the confined path being at least long enough to provide a substantially greater pressure drop across this portion of the passages than across that portion of the passages in the bed thereabove, reducing the gaseous pressure in said pressuring zone periodically to prevent said pressuring zone from emptying of solid material and to replenish said solid material supply from said first zone while, without obstructing said second confined path, maintaining the same filled substantially throughout its length with a compact column of said solids and withdrawing gas escaping upwardly from said path through the compact bed of said solids maintained in the pressuring zone on top of said column, said bed being of substantially greater horizontal cross-sectional area than said column.

4. The method of claim 3 with the exception that the minimum lateral width of the passages in the first and second confined paths is 1 inch, the maximum hydraulic radius of the passages is not greater than 4 inches, and the length of the passages in the first and second confined paths is at least 1 foot.

5. The method of claim 3 with the additional limitation that the passages in the first and second confined path have substantially equal hydraulic radii.

References Cited in the file of this patent

UNITED STATES PATENTS

| | | |
|---|---|---|
| 2,393,893 | Evans | Jan. 29, 1946 |
| 2,477,281 | Bergstrom | July 26, 1949 |